(12) United States Patent
Asthana et al.

(10) Patent No.: US 9,998,292 B2
(45) Date of Patent: Jun. 12, 2018

(54) PIM SOURCE DISCOVERY BY LAST HOP ROUTER ON SHARED TREE

(71) Applicant: Juniper Networks, Inc., Sunnyvale, CA (US)

(72) Inventors: Abhishek Asthana, Bangalore (IN); Shelesh Bansal, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 337 days.

(21) Appl. No.: 14/871,094

(22) Filed: Sep. 30, 2015

(65) Prior Publication Data
US 2017/0093589 A1    Mar. 30, 2017

(51) Int. Cl.
| | |
|---|---|
| *H04L 12/28* | (2006.01) |
| *H04L 12/18* | (2006.01) |
| *H04L 12/753* | (2013.01) |
| *H04L 12/773* | (2013.01) |
| *H04L 29/06* | (2006.01) |
| *H04L 12/761* | (2013.01) |
| *H04L 12/721* | (2013.01) |
| *H04L 12/931* | (2013.01) |

(52) U.S. Cl.
CPC ............ *H04L 12/185* (2013.01); *H04L 12/18* (2013.01); *H04L 45/16* (2013.01); *H04L 45/48* (2013.01); *H04L 45/60* (2013.01); *H04L 65/4076* (2013.01); *H04L 45/127* (2013.01); *H04L 45/26* (2013.01); *H04L 49/201* (2013.01)

(58) Field of Classification Search
None
See application file for complete search history.

(56) References Cited

U.S. PATENT DOCUMENTS

| | | | |
|---|---|---|---|
| 7,969,978 B2 | 6/2011 | Napierala | |
| 7,983,691 B1 | 7/2011 | Wong et al. | |
| 8,611,346 B1 | 12/2013 | Wijnands et al. | |
| 2004/0088307 A1 | 5/2004 | Von Bergen et al. | |

(Continued)

OTHER PUBLICATIONS

Office Action from U.S. Appl. No. 14/754,612, dated Apr. 10, 2017, 16 pp.

(Continued)

*Primary Examiner* — Chi H Pham
*Assistant Examiner* — Fahmida Chowdhury
(74) *Attorney, Agent, or Firm* — Shumaker & Sieffert, P.A.

(57) ABSTRACT

Techniques are described for enhancements to Protocol Independent Multicast (PIM) to enable a last hop router (LHR) to perform source discovery and directly build or join a source tree. According to the techniques of this disclosure, an LHR may be configured to receive a request to obtain multicast traffic corresponding to one or more multicast groups. The LHR may be configured to generate a source discovery join message including a request to join one or more multicast groups identified in the source discovery message and one or more source discovery flags. At least one of the one or more source discovery flags may indicate that the last hop router is interested in obtaining source information relating to at least one of the one or more multicast groups. The LHR may be configured to send, to a rendezvous point (RP) router in the network, the source discovery join message.

20 Claims, 7 Drawing Sheets

(56) References Cited

U.S. PATENT DOCUMENTS

| | | | |
|---|---|---|---|
| 2004/0205215 A1* | 10/2004 | Kouvelas | H04L 12/18 709/231 |
| 2006/0159092 A1* | 7/2006 | Boers | H04L 45/00 370/390 |
| 2006/0291444 A1 | 12/2006 | Alvarez et al. | |
| 2007/0058627 A1 | 3/2007 | Smith et al. | |
| 2007/0153790 A1 | 7/2007 | Boers et al. | |
| 2010/0067528 A1* | 3/2010 | Napierala | H04L 12/1836 370/390 |
| 2010/0195529 A1 | 8/2010 | Liu et al. | |
| 2011/0058548 A1 | 3/2011 | Fernández Gutiérrez | |
| 2011/0286450 A1* | 11/2011 | Wijnands | H04L 45/02 370/390 |
| 2012/0327764 A1* | 12/2012 | Han | H04L 12/185 370/219 |
| 2014/0269412 A1* | 9/2014 | Venaas | H04L 45/16 370/254 |
| 2016/0043932 A1* | 2/2016 | Karthikeyan | H04L 45/123 370/390 |
| 2016/0277199 A1 | 9/2016 | Nagarajan et al. | |
| 2017/0093589 A1 | 3/2017 | Asthana et al. | |

OTHER PUBLICATIONS

Wijnands et al., "PIM Flooding Mechanism and Source Discovery," Network Working Group Internet Draft, draft-ieff-pim-source-discovery-bsr-01.pdf, Jul. 3, 2014, 10 pp.

Korhonen et al., "IPv6 for Third Generation Partnership Project (3GPP) Cellular Hosts," RFC 7066, Internet Engineering Task Force, IETF, Nov. 2013, 20 pp.

Fenner et al., "Protocol Independent Multicast-Sparse Mode (PIM-SM): Protocol Specification (Revised)," RFC 4601, Network Working Group, The Internet Society, Aug. 2006, 112 pp.

Handley et al., "Bidirectional Protocol Independent Multicast (BIRDIR-PIM)," RFC 5015, Network Working Group, The Internet Society, Oct. 2007, 47 pp.

Adams et al., "Protocol Independent Multicast-Dense Mode (PIM-DM): Protocol Specification (Revised)," RFC 3973, Network Working Group, The Internet Society, Jan. 2005, 57 pp.

Holbrook et al., "Source-Specific Multicast for IP," RFC 4607, Network Working Group, The Internet Society, Aug. 2006, 19 pp.

Farinacci et al., "A Reliable Transport Mechanism for PIM," RFC 6559, Internet Engineering Task Force, IETF, Mar. 2012, 27 pp.

U.S. Appl. No. 14/754,612, by Vikram Nagarajan, filed Jun. 30, 2015.

Ed et al., "Reliable Transport for PIM Register States," Network Working Group Internet Draft, draft-anish-reliable-pim-registers-00, Mar. 9, 2015, 19 pp.

Peter et al., "PIM source discovery in Last-Hop-Router; draft-anish-pim-stream-discovery-01," Protocol Independent Multicast, Internet Draft, Jul. 6, 2015, 11 pp.

Fenner et al., "Protocol Independent Multicast—Sparse Mode (PIM-SIM) : Protocol Specification (Revised)," Network Working Group, RFC 4601, Aug. 2006, 150 pp.

Extended Search Report from counterpart European Application No. 16190824.9, dated Feb. 28, 2017, 11 pp.

Response to European Search Report and Opinion for European Patent Application No. 16190824.9, dated Feb. 28, 2017, filed Oct. 2, 2017, 22 pp.

Notice of Allowance from U.S. Appl. No. 14/754,612, dated Aug. 31, 2017, 11 pp.

* cited by examiner

PIM SOURCE DISCOVERY BY LAST HOP ROUTER ON SHARED TREE

TECHNICAL FIELD

The disclosure relates to computer networks and, more particularly, to distribution of multicast traffic over computer networks.

BACKGROUND

A computer network is a collection of interconnected computing devices that exchange data and share resources. In a packet-based network the computing devices communicate data by dividing the data into small blocks called packets. Certain devices within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. As an example, the computer network may utilize protocol independent multicast (PIM) as a multicast routing protocol to build distribution trees through the computer network for the transmission of multicast traffic from sources to receivers or subscriber devices for particular multicast groups. PIM may operate in several different modes, including Dense Mode (DM), Sparse Mode (SM) in Source-Specific Multicast (SSM) mode or Any Source Multicast (ASM) mode, and Bidirectional (BIDIR) mode.

SUMMARY

In general, techniques are described for enhancements to Protocol Independent Multicast (PIM) to enable a last hop router (LHR) to perform source discovery and directly build or join a source tree. According to one or more techniques of this disclosure, a router operating as a LHR in a network is configured to generate a source discovery join message identifying one or more multicast groups and to send the source discovery join message to a destination device, such as a rendezvous point (RP). The destination device may be configured to process the source discovery join message generate a source discovery message including source information indicating at least one source that is actively providing traffic for at least one of the one or more multicast groups identified in the source discovery join message. The destination device may generate the source discovery message in response to one or more flags in the source discovery join message. The destination device may then send the source discovery message to the LHR. Upon receiving the source discovery message, the LHR may initiate establishment of at least one source tree directly toward the at least one source for the at least one of the one or more multicast groups.

In one example, this disclosure is directed to a method comprising receiving, by a last hop router in a network, a request to obtain multicast traffic corresponding to one or more multicast groups. The method may comprise generating, by the last hop router, a source discovery join message including a request to join one or more multicast groups identified in the source discovery message and one or more source discovery flags. The one or more source discovery flags may each comprise one or more bits. At least one of the one or more source discovery flags may indicate that the last hop router is interested in obtaining source information relating to at least one of the one or more multicast groups. The message format to which the source discovery join message conforms may include a PIM Join message format. The method may comprise sending, by the last hop router to a rendezvous point (RP) router in the network, the source discovery join message.

In another example, this disclosure is directed to a network device. The network device may be configured to operate as a last hop router (LHR) in a network with the LHR comprising a memory and one or more processing units. The one or more processing units may be configured to receive a request to obtain multicast traffic corresponding to one or more multicast groups. The one or more processing units may be configured to store the request in the memory. The one or more processing units may be configured to generate a source discovery join message including a request to join one or more multicast groups identified in the source discovery message and one or more source discovery flags. The one or more source discovery flags may each comprise one or more bits. At least one of the one or more source discovery flags may indicate that the last hop router is interested in obtaining source information relating to at least one of the one or more multicast groups. The message format to which the source discovery join message conforms may include a PIM Join message format. The one or more processing units may be configured to send, to a rendezvous point (RP) router in the network, the source discovery join message.

In a further example, this disclosure is directed to a method comprising receiving, by a rendezvous point (RP) router in a network, a source discovery join message including a request to join one or more multicast groups identified in the source discovery message and one or more source discovery flags. The one or more source discovery flags may each comprise one or more bits. At least one of the one or more source discovery flags may indicate that a last hop router is interested in obtaining source information relating to at least one of the one or more multicast groups. The message format to which the source discovery join message conforms may include a PIM Join message format. The method may comprise generating, by the RP router, a source discovery message including source information indicating at least one source that is actively providing traffic for at least one of the one or more multicast groups identified in the source discovery join message. The source discovery message may include one or more source discovery flags. The method may comprise sending, by the RP router to the last hop router, the source discovery message.

In an additional example, this disclosure is directed to a network device. The network device may be configured to operate as a rendezvous point (RP) router in a network with the RP router comprising a memory and one or more processing units. The one or more processing units may be configured to receive a source discovery join message including a request to join one or more multicast groups identified in the source discovery message and one or more source discovery flags. The one or more source discovery flags may each comprise one or more bits. At least one of the one or more source discovery flags may indicate that a last hop router is interested in obtaining source information relating to at least one of the one or more multicast groups. The message format to which the source discovery join message conforms may include a PIM Join message format. The one or more processing units may be configured to store the source discovery join message in the memory. The one or more processing units may be configured to generate a source discovery message including source information indicating at least one source that is actively providing traffic for at least one of the one or more multicast groups identified in the source discovery join message. The source discovery message may include one or more source discovery flags. The one or more processing units may be configured to send, to the last hop router, the source discovery message.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
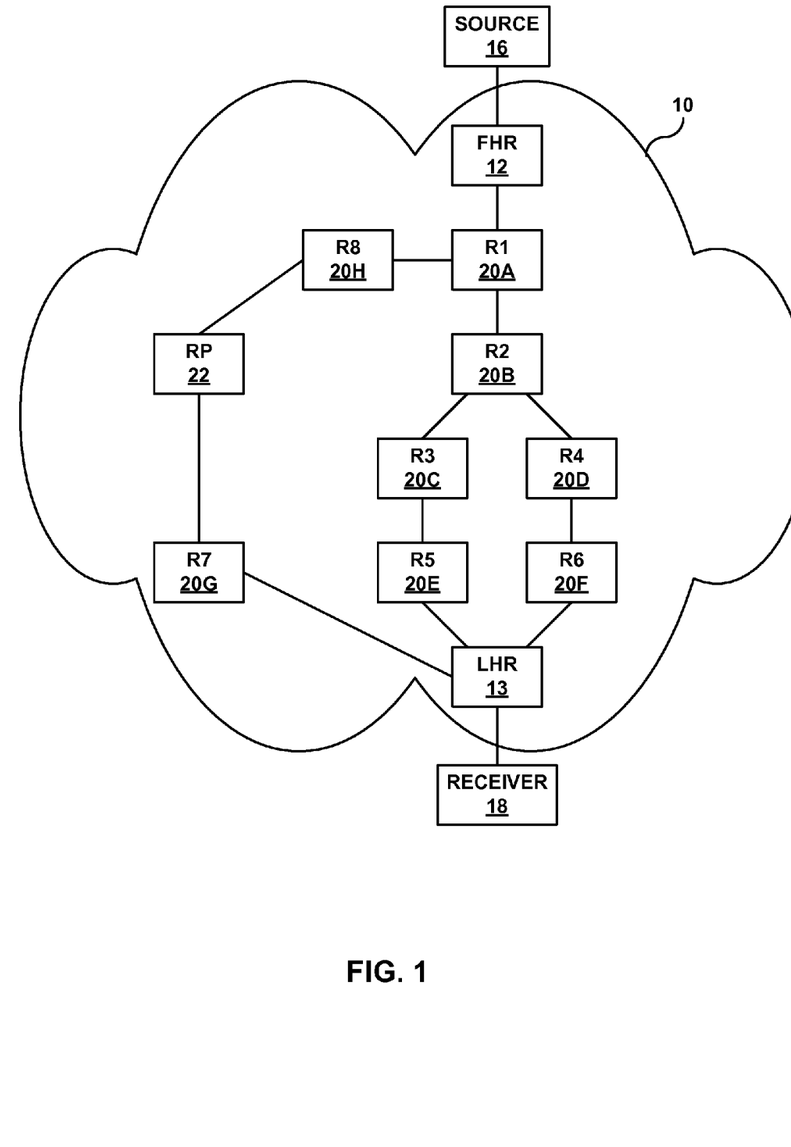
FIG. 1 is a block diagram illustrating an example computer network including routers configured to transmit multicast traffic between a source and a receiver.

FIG. 1 is a block diagram illustrating an example computer network 10 including routers configured to transmit multicast traffic between a source 16 and a receiver 18. Network 10 may comprise a private network, a public network, any network, or any combinations thereof. For example, network 10 may include the Internet. As another example, network 10 may include an enterprise network, a campus network, a service provider network, a home network, a local area network (LAN), a virtual local area network (VLAN), virtual private network (VPN), or another autonomous system. In any of these examples, remotely located source 16 and receiver 18 may share data via network 10. In an example of network 10 as an enterprise network, each of source 16 and receiver 18 may comprise one or more servers or employee computer terminals located in different regions of a single office location, or may comprise a remote office location of a corporation.

In the illustrated example, network 10 comprises an Internet Protocol (IP) network including routing devices that may be configured to use a Protocol Independent Multicast (PIM) protocol to route multicast traffic through network 10 between source 16 and receiver 18 for one or more multicast groups. Network 10 includes a first hop router (FHR) 12 connected to source 16, a last hop router (LHR) 13 connected to receiver 18, a plurality of transit routers 20A-20H ("routers 20"), and a router designated as a rendezvous point (RP) 22 (e.g., an RP router). In some examples, an RP router may be a router that acts exclusively as a rendezvous point. In other examples, an RP router may have an association with a rendezvous address or otherwise be associated with a rendezvous address. In some examples, such as in a typical network topology that utilizes the PIM protocol, additional transit routers may be included beyond what is shown in FIG. 1. For example, additional transit routers may be included to the left of RP 22 such that RP 22 is generally centrally located within network 10. For purposes of illustration, these additional routers are not shown in FIG. 1.

As used herein, the term "connected" may refer to any connection enabling communication between the connected devices. In some examples, the term "connected" may refer to a wired connection. In other examples, the term "connected" may refer to a wireless connection. In other examples, the term "connected" may refer to a wired and wireless connection. In yet other examples, the term "connected" may refer to any form of communicative coupling (e.g., wired, wireless, other a combination thereof). It is also understood that the term "connected" may refer to direct or indirect connections. For example, referring to FIG. 1, source 16 may be considered directly connected to FHR 12, but may be considered to be indirectly connected to any network device downstream of FHR 12. However, it is also understood that FIG. 1 is a simplified example of a network configuration.

Each of source 16 and receiver 18 may be included in a remote site (not shown) that may be a local area network (LAN) or a wide area network (WAN) comprising a plurality of subscriber devices, such as desktop computers, laptops, workstations, PDAs, wireless devices, network-ready appliances, file servers, print servers or other devices. The remote sites may be configured to support multicast traffic, such as Internet Protocol Television (IPTV), desktop conferences, corporate broadcasts, music and video web casts, and other forms of multimedia content.

Source 16 may provide traffic for one or more multicast groups. Receiver 18 may request or subscribe to traffic from one or more multicast groups. In other examples, routers within network 10 may be connected to more than one source and/or more than one receiver. Receiver 18 may subscribe to a specific multicast group to receive multicast traffic. According to the PIM protocol, RP 22 may learn and store source addresses for a certain range of multicast groups provided by source 16 and/or other sources in network 10. Other RPs in network 10, not shown in FIG. 1, may be associated with different ranges of multicast groups provided by source 16 and/or one or more other sources. In this way, each of FHR 12, LHR 13, and routers 20 may not learn and store the source addresses for every multicast group offered in network 10, but may only learn the addresses of RP 22 and the other RPs associated with different ranges of multicast groups. In the illustrated example of FIG. 1, RP 22 may know the address of source 16, but FHR 12, LHR 13 and routers 20 may only know the address of RP 22.

The PIM protocol may operate in several different modes, including Dense Mode (DM), Sparse Mode (SM) in Source-Specific Multicast (SSM) mode or Any Source Multicast (ASM) mode, and Bidirectional (BIDIR) mode. Additional information regarding PIM protocols may be found in Adams, A., et al., "Protocol Independent Multicast Version 2—Dense Mode Specification," IETF RFC 3973, 2005; Fenner, B., et al., "Protocol Independent Multicast-Sparse Mode (PIM-SM): Protocol Specification (Revised)," IETF RFC 4601, 2006; Holbrook, H. and B. Cain, "Source-Specific Multicast for IP," IETF RFC 4607, 2006; and Handley, M., et al., "Bidirectional Protocol Independent Multicast (BIDIR PIM)," IETF RFC 5015, 2007, the entire contents of each of which are incorporated by reference herein.

One or more techniques described herein may provide enhancements to PIM to enable a last hop router (LHR) (e.g., LHR 13) to perform source discovery to learn source addresses of multicast groups for which the LHR has interested receivers (e.g., receiver 18 and/or any other receiver(s)). In some examples, LHR 13 may be configured to perform source discovery by generating a source discovery Join message based on information received from one or more receivers (e.g., receiver 18 in the example shown) connected to the LHR. The source discovery Join message may be a modified PIM join message that includes additional information, e.g., bits or flags, to indicate that LHR 13 is interested in receiving the source addresses of the multicast groups from RP 22. The term Source Discovery Join message may be referred to as an SDJ message herein. While one or more techniques described herein are described with respect to PIM Join messages or otherwise PIM Join packets, it is understood that these one or more techniques may equally apply to PIM Prune messages or otherwise PIM Prune packets. In such examples, the term Source Discovery Prune message may be referred to as an SDP message herein. As one example, any description relating to an SDJ message may also apply to an SDP message with the understanding that the functionality relating to the Join aspect of the SDJ message is different than the functionality relating to the Prune aspect of the SDP message. As another example, a Prune message may be generated such that it includes one or more SD bits as described herein thus constituting an SDP message. The SDJ and/or SDP messages may each include further information beyond the values of the one or more SD bits. For example, the SDJ and/or SDP message may include one or more multicast group identifiers.

In some examples, an SDJ message may include information indicative of LHR 13's interest in performing source discovery. The information indicative of the LHR 13's interest in performing source discovery may be based on information received from one or more receivers connected to LHR 13. In some examples, an SDJ message may include one or more bits indicative of the LHR's interest in performing source discovery. The one or more bits indicative of the LHR 13's interest in performing source discovery may be referred to as one or more SD bits herein. The one or more SD bits may constitute one or more source discovery flags which may be referred to herein as one or more SD flags. In some examples, an SD flag may be one or more bits. For example, a two-state SD flag may be a single bit and a four-state SD flag may be two bits. The one or more SD bits may constitute one or more reserve bits in a PIM Join message. Otherwise stated, one or more reserve bits in a PIM Join message may be used as the one or more SD bits (or as one or more SD flags).

In some examples, the one or more SD bits may comprise a D flag and/or an F flag. Each of these flags may be one or more bits. The term D flag may be shorthand for Discovery bit (i.e., (D)iscovery bit). The term F flag may be shorthand for Full dump bit (i.e., (F)ull dump bit).

In some examples, the D flag may be a reserve bit used for a particular purpose and the F flag may be a reserve bit used for a particular purpose. For example, the value of the D flag may represent LHR 13's interest for source discovery. In such an example, the value of the D flag may represent LHR 13's interest in obtaining or otherwise requesting an SD message from an RP router. Upon receipt of an SDJ message with the D flag having a first value, an RP router may be configured to not generate an SD message described herein. However, upon receipt of an SDJ message with the D flag having a second value different from the first value, RP router 22 may be configured to generate an SD message for transmission to LHR 13 that generated and sent the SDJ message.

In some examples, the F flag may represent LHR 13's interest in receiving or otherwise requesting a full dump of active sources. In such an example, the value of the F flag may represent LHR 13's interest in receiving or otherwise requesting a full list of active sources identifiable by RP router 22 processing the SDJ message. Upon receipt of an SDJ message with the F flag having a first value, an RP router may be configured to not generate an SD message that identifies all active sources. However, upon receipt of an SDJ message with the F flag having a second value different from the first value, RP router 22 may be configured to generate an SD message that identifies all active sources (e.g., all active sources identifiable by the RP router) for transmission to LHR 13 that generated and sent the SDJ message. For example, a select value of the F flag may inform RP router 22 that a downstream router (e.g., an LHR) wants a full dump of all the presently active sources for one or more particular groups (e.g., one or more groups identified in the SDJ message). In some examples, the value of an F flag may only carry meaning if the D flag is set to a value which represents LHR 13's interest in in obtaining or otherwise requesting an SD message from an RP router. For example, RP router 22 may only provide a full dump (e.g., a list identifying all active sources for one or more particular groups identified in the SDJ message) if the D flag is set to a value which represents LHR 13's interest in in obtaining or otherwise requesting an SD message from RP router 22. Otherwise, RP router 22 may be configured to ignore the value of the F flag if the D flag is not set (e.g., if the D flag has a value that indicates that the LHR is not interested in obtaining or otherwise requesting an SD message from RP router 22.

In some examples, LHR 13 may send an SDJ message with the F flag set if it is the first time that the LHR is requesting source information for a multicast group. In this way, LHR 13 receives all source info related to the multicast group, which may constitute an initial syncing of source information for the multicast group. Going forward (e.g., beyond the initial syncing of source information), LHR 13 may only need to receive updates to the source information, so requesting a full dump with the F-bit is not necessary. For example, updates may comprise any changes to source information compared to the full dump previously received as part of the initial syncing process.

After generating the SDJ message, an LHR may transmit the SDJ message such that the SDJ message is destined for one or more routers designated as RP routers. In some examples, the LHR may be directly connected to one or more destination RP routers. In other examples, the LHR may be indirectly connected to one or more destination RP routers. For example, the LHR may be indirectly connected to one or more destination RP routers through one or more intermediate network devices (e.g., one or more routers). For example, as shown in the example of FIG. 1, LHR 13 may be indirectly connected to RP router 22 via one or more paths through one or more intermediate network devices. Upon receipt of an SDJ message, a network device (e.g., a router) may be configured to forward or otherwise transmit the SDJ message to another network device (e.g., a destination RP router or another intermediate router).

In some examples, LHR 13 may be configured to send the SDJ message upstream if the LHR is configured to process an SD message described herein. In other examples, LHR 13 may be configured to send the SDJ message upstream if the LHR is configured to receive all downstream Joins with the D-bit set. For example, an intermediate router may need to combine together the interests of more than one downstream routers (multiple downstream routers/LHRs interested in the same traffic). If one of the LHRs is configured to perform source discovery as described herein (e.g., setting a D flag and/or F flag in an SDJ message) but another one of the LHRs may not be configured to perform source discovery as described herein (e.g., a legacy LHR that is not capable of supporting this change), then the intermediate router may not send an SDJ message for the multicast group upstream with an SD bit set because at least one of its downstream routers/LHRs expects to receive data traffic and not a source discovery message.

Upon receipt of an SDJ message, a network device (e.g., RP router 22) may be configured to process a received SDJ message. In some examples, processing an SDJ message may include determining the value of one or more of the one or more SD bits. Based on one or more values of the one or more SD bits, the network device (e.g., RP router 22) may be configured to generate a source discovery message which may be referred to herein as an SD message. The content of the SD message may be based on one or more values of the one or more SD bits. In some examples, the SD message may include source information for one or more multicast groups for which LHR 13 has interested receivers. In some examples, the SD message may include information indicative of which source is active or which sources are active. In some examples, the SD message may include information that identifies all active sources. In some examples, the SD message may include information relating to one or more active sources and/or one or more inactive sources.

In some examples, a network may include an RP router (e.g., RP router 22) that may be configured to receive Join messages and SDJ messages from one or more LHRs (e.g., LHR 13). For example, LHR 13 may generate SDJ messages and/or non-SDJ messages (e.g., traditional or conventional Join messages, etc.). In other examples, at least one LHR (e.g., LHR 13) in a network may be configured to generate SDJ messages and at least one LHR in a network may be configured to generate non-SDJ messages (e.g., regular Join messages, traditional Join messages, etc.). In examples where an RP router (e.g., RP router 22) receives a Join message without one or more SD bits set (e.g., an SDJ message without the D flag set, or a non-SDJ message that does not utilize one or more reserve bits as one or more SD bits), RP router 22 may be configured to process such a Join message in the traditional manner (e.g., initiate Join towards FHR to initiate data traffic to the RP router and ultimately to the LHR from which the LHR may use to determine the identity of the active source and, in turn, build a shortest path tree directly to the source. In such examples, RP router 22 may only send data traffic to the outgoing interfaces from which the Join messages were received without the D-bit being set or without the D-bit existing.

RP router 22 may be configured to send an SD message generated by the RP router to one or more LHRs (e.g., LHR 13). For example, RP router 22 may be configured to send the generated SD message to LHR 13 that sent the SDJ message for which the SD message is generated.

In some examples, RP router 22 may be configured to send a generated SD message only on the interfaces from which the SDJ message with a set D flag is received. In some examples, RP router 22 may be configured to periodically send an SD message until LHR 13 informs the RP router to stop sending the SD message with a prune message. As used herein, a set D flag or otherwise a D flag being set may refer to the value of the D flag configured to cause an RP router to generate an SD message as described herein. Similarly, as used herein, a set F flag or otherwise a F flag being set may refer to the value of the F flag configured to cause an RP router to provide a full dump of active sources as described herein. In some examples, an RP router may be configured to send an SD message on all interfaces to those routers that support handling of an SD message. In some examples, RP router 22 may be configured to set an F flag in the SD message. Intermediate routers between RP router 22 and LHR 13 may route the SD message with the set F flag on the interfaces from which an SDJ message was previously received with the F flag set.

It is understood that an SD message may get lost on its way to LHR 13 or for whatever reason may not ultimately be received by an expectant LHR (e.g., LHR 13 that generated and sent an SDJ message, and is expecting an SD message from an RP router in response thereto). Accordingly, in some examples, RP router 22 may be configured to send an SD message one or more times up to a count limit (e.g., an SD Send Count limit). In such examples, RP router 22 may be configured to send an SD message a first time, and increment a SD Send Count value. RP router 22 may be configured to send the SD message a second time (e.g., re-send the SD message for a first time) and increment the SD Send Count value if the RP router does not receive an acknowledge receipt from LHR 13 indicating that it has received the SD message. This process may continue until the SD Send Count value reaches the SD Send Count limit. For example, if the SD Send Count limit is 2, then in the example immediately above, RP router 22 may only be configured to send the SD message twice before letting the SD message drop (e.g., first sending being the initial transmission and second sending being the first re-transmission of the SD message). In other examples, RP router 22 may be configured to re-send an SD message one or more times up to the point that the SD Sent Count value reaches the SD Sent Count limit regardless of whether the LHR has successfully received prior transmissions of the SD message. In yet other examples, RP router 22 may be configured to utilize an existing (S, G) prune message on a shared tree to determine whether to re-send an SD message. For example, RP router 22 may be configured to periodically send an SD message until LHR 13 informs the RP router to stop sending the SD message with a prune message.

In other examples, an expectant LHR (e.g., LHR 13 that generated and sent an SDJ message, and is expecting an SD message from an RP router in response thereto) may be configured to re-send the SDJ message if an SD message is not received. In such examples, LHR 13 may be configured to re-send the SDJ message based on an SDJ Send Count value and SDJ Send Count limit similar to the methodology described above with respect to RP router 22 and the SD Send Count value and limit.

Upon receipt of an SD message, LHR 13 may be configured to initiate an (S, G) Join message towards the source and create a source tree. In some examples, LHR 13 may be configured to send an (S,G-RPT) message to RP router 22 that transmitted the SD message to stop re-transmission of the SD message. For example, LHR 13 may be configured to send an acknowledgement receipt to RP router 22 informing the RP router that the LHR received the SD message.

By generating an SDJ message and sending the SDJ message to RP router 22 for processing, LHR 13 may be configured to build or join a source tree directly to a given source (e.g., source 16) based on the SD message associated with the SDJ message instead of first building or joining a shared tree toward RP router 22. For purposes of this disclosure, a source tree may be defined as a multicast distribution tree established along a shortest path between a LHR connected to a receiver and a FHR connected to a source. In some examples, one or more techniques described herein may enable multicast traffic to follow a shortest path tree and avoid a shared-RP-tree. For example, LHR 13 may be configured to build a shortest path tree based on one or more techniques described herein which may result in the multicast traffic avoiding a shared-RP-tree.

In some examples, when a new receiver becomes active, LHR 13 may be configured to generate and send an SDJ message towards a shared tree with which the new receiver is associated. In some examples, this SDJ message sent as a result of a new receiver being active may have both the D flag and the F flag set. RP router 22 may be configured to process and analyze the SDJ message, and upon determining the F flag is set, the RP router may immediately send the dump of all active sources for the one or more groups identified in the SDJ message. This full dump may constitute information in the SD message generated and sent by RP router 22 in response to the SDJ message. If there are any intermediate routers between LHR 13 and RP router 22, each intermediate router may be configured to receive an SDJ message and transmit the SDJ message upstream (e.g., towards the RP router). Each intermediate router may be configured to maintain a list of the interface(s) on which the SDJ message is received. For example, each intermediate router may be configured to maintain a list of the interface(s) on which the SDJ message including a set F flag is received. Each intermediate router may be configured to receive an SD message and transmit the SD message downstream (e.g., towards the LHR). In some examples, each intermediate router may be configured to receive an SD message including a set F flag, and may be configured to send the SD message downstream only on the interfaces from where the SDJ message including the set F flag was received.

In some examples, RP router 22 may be configured to always respond to SDJ messages that include a set F flag. If there are no active sources, RP router 22 may be configured to transmit an SD message with zero active sources (e.g., the SD message does not identify or otherwise include any active source). In some examples, if LHR 13 does not receive an SD message with an F flag set in response to the LHR's SDJ message with an F flag set, the LHR should resend the SDJ message with the F flag set.

As described in more detail herein, this disclosure describes one or more techniques in which an LHR (e.g., LHR 13) discovers the source in a particular way, and may thereby directly build only "shortest-path-trees" to the source. According to one or more techniques of this disclosure, an LHR (e.g., LHR 13) may be configured to perform source discovery by generating an SDJ message based on information received from one or more receivers connected to the LHR. The LHR may be configured to send the SDJ message to an RP-designated router (e.g., RP router 22). The RP router may receive the SDJ message directly or indirectly from the LHR. The RP router may process the SDJ message, which may result in the RP router providing source information for at least one multicast group for which the LHR has interested receivers to the LHR. For example, the RP router may send an SD message to the LHR, which the LHR may directly or indirectly receive from the RP router. The SD message may include, for example, source information indicating at least one source that is actively providing traffic for the at least one multicast group for which the LHR has interested receivers. Based on information in the SD message, the LHR may be configured to initiate a (S,G) PIM Join message toward the at least one source for the at least one multicast group to directly build or join at least one source tree. One or more techniques described herein may avoid the issues of state explosion and data driven events encountered in the PIM ASM mode. Additionally or alternatively, one or more techniques described herein may avoid the practical difficulty of pre-learning source information and configuring hosts with the source information encountered in the PIM SSM mode.

Figure 2A:
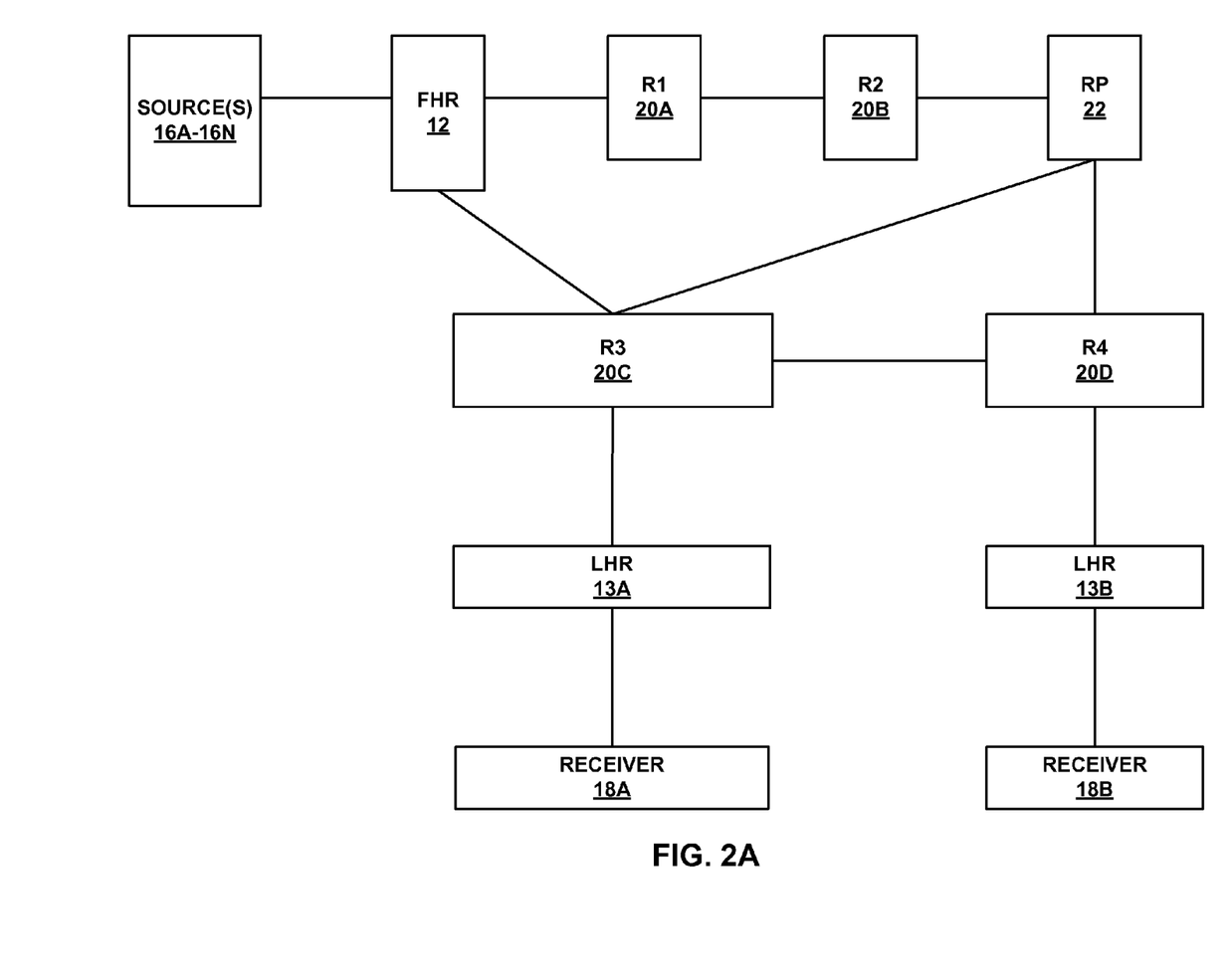
FIG. 2A is a block diagram illustrating an example computer network including routers configured to transmit multicast traffic between a source and a receiver with the network operating in accordance with one or more techniques of this disclosure.

FIG. 2A is a block diagram illustrating another example of computer network 10 including routers configured to transmit multicast traffic between (1) one or more sources 16A-16N where 16N represents the Nth source and (2) first receiver 18A and/or second receiver 18B. While one or more sources 16A-16N is depicted as a single box, it is understood that each of the one or more sources 16A-16N may be a different device. However, in other examples, it is understood that a plurality of the one or more sources 16A-16N may reside within the same device. For example, the same device may host two or more different sources. In the example shown in FIG. 2A and similar to FIG. 1, network 10 comprises an Internet Protocol (IP) network including routing devices that may be configured to use a Protocol Independent Multicast (PIM) protocol to route multicast traffic through network 10 between one or more sources 16A-16N and one or more receivers (e.g., two receivers are shown for simplicity in describing certain techniques of this disclosure) for one or more multicast groups. Network 10 includes first hop router (FHR) 12 connected to one or more sources 16A-16N, first LHR 13A connected to receiver 18A, second LHR 13B connected to receiver 18B, a plurality of transit routers 20A-20D ("routers 20"), and router 22 designated as a rendezvous point (RP) which may be referred to as RP router 22. In some examples, such as in a typical network topology that utilizes the PIM protocol, additional transit routers may be included beyond what is shown in FIG. 2A.

One or more sources 16A-16N may each provide traffic for one or more multicast groups. Receiver 18A and/or receiver 18B may request or subscribe to traffic from one or more multicast groups. For example, receiver 18A may subscribe to a first multicast group to receive multicast traffic, and receiver 18B may subscribe to a second multicast group to receive multicast traffic. According to the PIM protocol, RP 22 may learn and store source addresses for a certain range of multicast groups provided by one or more sources 16A-16N and/or other sources in network 10. Other RPs in network 10, not shown in FIG. 2A, may be associated with different ranges of multicast groups provided by one or more sources 16A-16N and/or one or more other sources. In this way, each of FHR 12, LHR 13A, LHR 13B, and routers 20 may not learn and store the source addresses for every multicast group offered in network 10, but may only learn the addresses of RP 22 and the other RPs associated with different ranges of multicast groups. In the illustrated example of FIG. 2A, RP 22 may know the address(es) of one or more sources 16A-16N, but FHR 12, LHR 13A, LHR 13B, and routers 20 may only know the address of RP 22.

One or more techniques described herein may provide enhancements to PIM to enable a last hop router (LHR) (e.g., LHR 13A and/or LHR 13B) to perform source discovery to learn source addresses of multicast groups for which the LHR has interested receivers (e.g., receiver 18A, receiver 18B, and/or any other receiver(s)).

In some examples, LHR 13A may be configured to perform source discovery by generating an SDJ message described herein based on information received from one or more receivers (e.g., receiver 18A in the example shown) connected to the LHR, and LHR 13B may be configured to receive multicast traffic through traditional means. In some examples, LHR 13A may generate and send an SDJ message as described herein with respect to other LHRs described herein (e.g., LHR 13). RP router 22 may receive and process an SDJ message transmitted by LHR 13A as described herein. RP router 22 may generate and send an SD message as described herein to LHR 13A. In other examples, both LHR 13A and 13B may be configured to perform one or more techniques of this disclosure.

In some examples, when a receiver becomes active, LHR 13A and/or LHR13B may each generate and send an SDJ message with a D flag set and an F flag set. Router R3 20C and router R4 20D may each respectively forward the SDJ message sent by LHR 13A and LHR 13B toward RP router 22. RP router 22 may be configured to understand the meaning of the one or more SD bits (e.g., the meaning of the D flag and/or the F flag being set or not being set). For example, if RP router 22 understands the D-flag and receives the D-flag on all joins, the RP router sends the SD message with the F flag set to both router R3 20C and router R4 20D. In this example, the SD may message may include identification of all presently active sources (if any). However, if RP router is not configured to understand the meaning of the one or more SD bits, then the RP router will ignore the extra bits and operate as usual to request traffic from the source.

In some examples, when a new source becomes active, FHR 12 may send a register packet to RP router 22. Upon receiving the register packet, RP router 22 may form the source discovery packet without the F flag set and forward the SD message towards router R3 20C and router R4 20D. In some examples, the SD message may be periodically sent until an (S, G-RPT) message is seen to mitigate losses due to, for example, source discovery packet transmission errors. Routers R3 20C and R4 20D may each process any source discovery packets and forward them to LHR 13A and LHR 13B, respectively. Upon receipt of the SD message, LHR 13A and LHR 13B may each send an (S, G-RPT) message towards RP router 22 to inform the RP router that the requested source information was received. LHR 13A and LHR 13B may each join FHR 12 via SPT and pull traffic. In the example shown, the SPT for LHR 13A is the path of LHR13A to router R3 20C to FHR 12, and the SPT for LHR 13B is the path of LHR 13B to router R4 20D to router R3 20C to FHR 12.

In some examples, if either router R4 20D or LHR 13B is not configured to perform one or more techniques described herein to perform source discovery, then the following may occur. If a receiver becomes active, then LHR 13A may send an SDJ message with a D flag set. Router R3 20C may forward the SDJ message toward RP router 22. Router R4 20D may either receive an SDJ message with a D flag set or may receive a traditional join message. Router R4 20D may not support or otherwise be configured to recognize the D flag. Therefore, in either case, router R4 20D may be configured to forward the SDJ message without the D flag set to RP router 22. In this example, RP router 22 understands that not all received join message include a set D flag. In some examples, RP router 22 may be configured to understand the meaning of the one or more SD bits (e.g., the meaning of the D flag and/or the F flag being set or not being set). For example, if RP router 22 understands the D-flag on the message received from LHR 13A, the RP router sends the SD message with the F flag set to router R3 20C but not router R4 20D. In this example, since the message received from router R4 20D did not include a D flag being set, RP router 22 may be configured to send multicast traffic through traditional means to router R4 20D (instead of an SD message) which is then forwarded to LHR 13B in this example.

In some examples, if either router R4 20D or LHR 13B is not configured to perform one or more techniques described herein to perform source discovery, then the following may occur. If a new source becomes active, FHR 12 may send a register packet to RP router 22. Upon receiving the register packet, RP router 22 may join FHR 12 by sending an (S, G) join message to pull native traffic. RP router 22 may form the source discovery packet and forward the SD message towards router R3 20C. RP router 22 receives multicast traffic from the source due to the (S, G) join message, and forward received multicast traffic to router R4 20D. Router R3 20C may process any source discovery packets and forward them to LHR 13A. Upon receipt of the SD message, LHR 13A may send an (S, G-RPT) message towards RP router 22 to inform the RP router that the requested source information was received. LHR 13A and LHR 13B may each join FHR 12 via SPT and pull traffic with the understanding that LHR 13A built the SPT via the SD message and that LHR 13B built the SPT via the multicast traffic forwarded by RP router 22 in this example. In the example shown, the SPT for LHR 13A is the path of LHR13A to router R3 20C to FHR 12, and the SPT for LHR 13B is the path of LHR 13B to router R4 20D to router R3 20C to FHR 12.

Figure 2B:
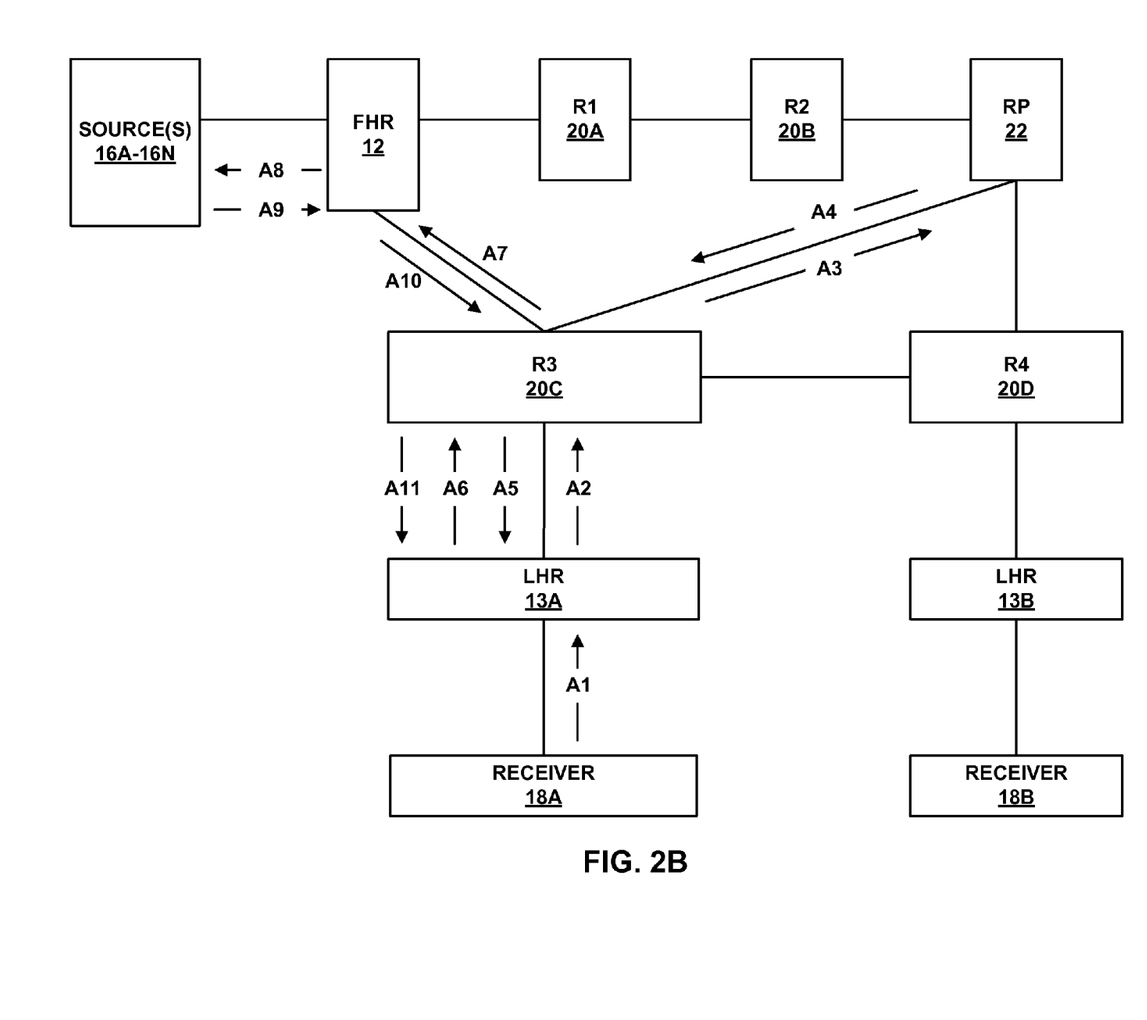
FIG. 2B is a block diagram illustrating an example computer network including routers configured to transmit multicast traffic between a source and a receiver with the network operating in accordance with one or more techniques of this disclosure.

FIG. 2B is a block diagram illustrating the example of computer network 10 shown in FIG. 2A except that FIG. 2B further includes an exemplary arrows showing an exemplary process flow where LHR 13A is configured to perform one or more techniques of this disclosure. Arrow A1 represents receiver 18A requesting multicast traffic from LHR 13A. LHR 13A processes the information sent to it by receiver 18A, and in turn generates an SDJ message including a set D flag (e.g., ((*, G)+D)). Arrow A2 represents the SDJ message being transmitted by LHR 13A to router R3 20C. The SDJ message may be addressed such that it is destined for RP router 22. Determining that the SDJ message is destined for RP router 22, router R3 20C may send the SDJ message to the RP router 22, which is shown by arrow A3. Based on the SDJ message, RP router 22 may be configured to obtain the requested source discovery information if the RP router 22 does not already possess such information. For example, RP router 22 may learn or otherwise derive the source information requested by LHR 13A via the SDJ message based on information from one or more PIM register messages, and may generate an SD message to send back to LHR 13A.

Arrow A4 represents RP router 22 sending a generated SD message destined for LHR 13A to router R3 20C. Arrow A5 represents router R3 20C sending the SD message to LHR 13A. LHR 13A may in turn initiate establishment of a shortest path tree (SPT) to one or more of sources 16A-16N based on the SD message. In the example shown, the SPT from LHR13A to one or more sources 16A-16N is depicted by arrows A6, A7, and A8, which also represent a Join message being sent hop-by-hop to one or more sources 16A-16N. In response to receiving a Join message sent by LHR 13A, the one or more sources 16A-16N may transmit multicast data traffic associated with the Group(s) identified in the Join message to LHR 13A, which is shown by arrows A9, A10, and A11.

As illustrated in FIG. 2B, one or more techniques of this disclosure may not have any need for "shared trees" or "pruning the shared tree for the source tree" unlike in the PIM ASM mode. As a result, one or more techniques of this disclosure may have direct positive implications on scaling, convergence, reduction in complexity, and trouble-shooting. One or more techniques described herein may be referred to as PIM source discovery by the last hop router.

Figure 3:
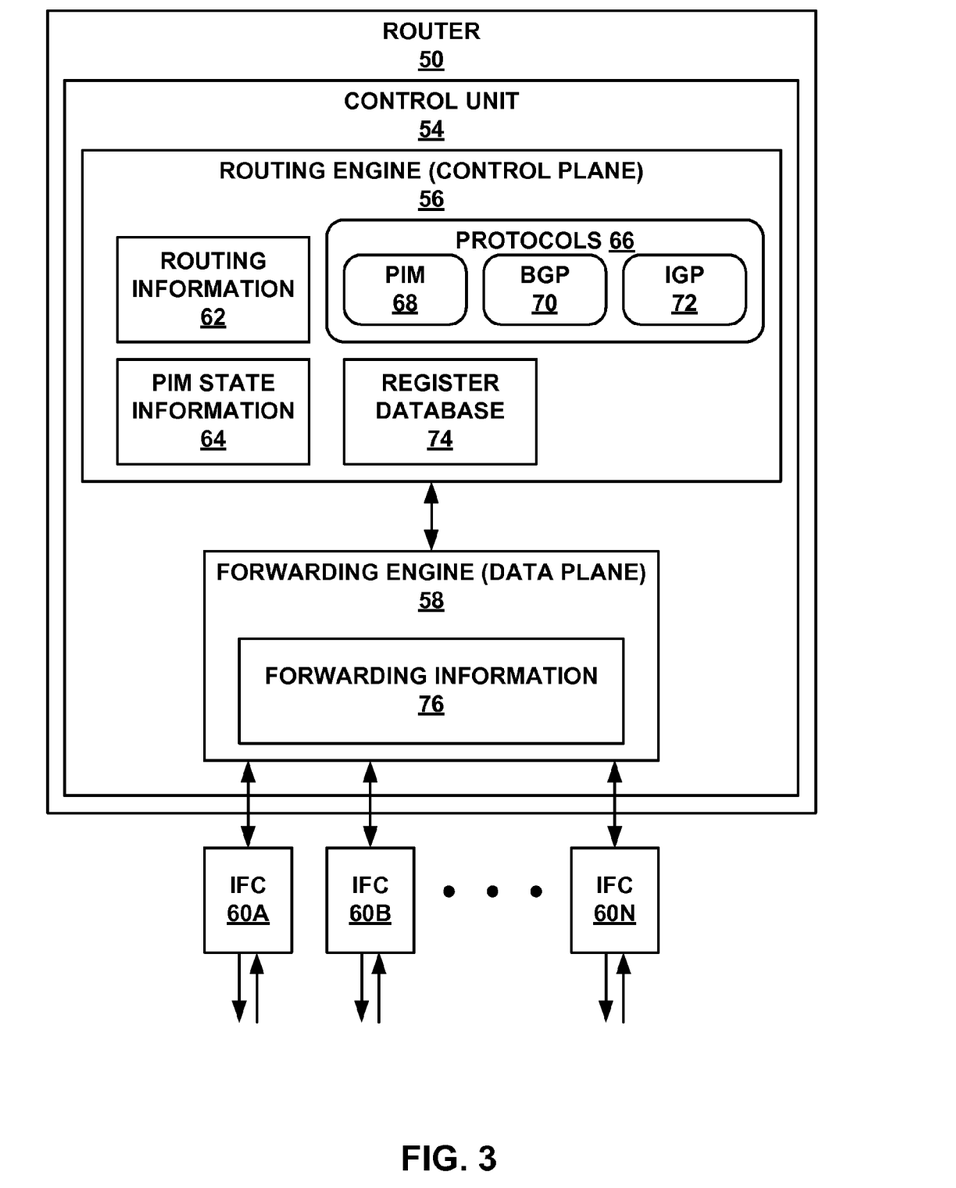
FIG. 3 is a block diagram illustrating an example router capable of performing the disclosed techniques of source discovery by a last hop router.

FIG. 3 is a block diagram illustrating an example router 50 capable of performing the disclosed techniques of PIM source discovery by a last hop router. In one example, router 50 may operate as a last hop router (LHR) configured to perform one or more techniques described herein with respect to an LHR. For example, router 50 may operate substantially similar to LHR 13A from FIGS. 2A and 2B. In other examples, router 50 may operate as a RP or controller router configured to perform one or more techniques described herein. For example, router 50 may operate substantially similar to RP router 22 from FIGS. 2A and 2B.

In the illustrated example of FIG. 3, router 50 includes interface cards 60A-60N ("IFCs 60") that are configured to receive multicast packets via incoming links and configured to send multicast packets via outbound links. IFCs 66 are typically communicatively coupled to the incoming links and the outbound links via a number of interface ports. Router 50 may include a control unit 54 that determines routes of received packets and forwards the packets accordingly via IFCs 66.

Control unit 54 may include a routing engine 56 and a forwarding engine 58. Routing engine 56 may operate as the control plane for router 50 and may include an operating system that may provide a multi-tasking operating environment for execution of a number of concurrent processes. For example, routing engine 56 may provide an operating environment for various protocols 66 that perform routing functions for router 50. In the illustrated example of FIG. 3, routing engine 56 may include a border gateway protocol (BGP) 70 and an interior gateway protocol (IGP) 72 as unicast routing protocols that may be used to exchange routing information with other routing devices in a network in order to discover the network topology and update routing information 62. In the examples described in this disclosure, IGP 72 may be a link-state routing protocol such as open shortest path first (OSPF) or intermediate system-intermedia system (IS-IS). Routing engine 56 may include PIM 68 as a multicast routing protocol used to build multicast distribution trees with the other routing devices in the network using routing information 62 and PIM state information 64.

As used herein, control unit 54 may be considered or otherwise comprise one or more processing units. Similarly, routing engine 56 may be considered or otherwise comprise one or more processing units. Similarly, forwarding engine 58 may be considered or otherwise comprise one or more processing units.

Routing information 62 may describe the topology of the network in which router 50 resides, and may also describe various routes within the network and the appropriate next hops for each route, i.e., the neighboring routing devices along each of the routes. Routing information 62 may include a list of incoming interfaces (IIFs) and a list of outgoing interfaces (OIFs) that indicate which of IFCs 60 are connected to the neighboring routing devices in each route. For example, a given route may comprise a multicast route for multicast traffic for a given multicast group. In that example, the list of IIFs included in routing information 62 for router 50 may include a list of upstream interfaces for all upstream routers that have PIM state for the given multicast group.

PIM state information 64 may describe a current status of links to the neighboring routing devices in the multicast distribution trees established using PIM 68. For example, PIM state information 64 may include PIM join states that describe which neighboring routing devices belong to which multicast groups within the range for a given multicast distribution tree. Routing engine 56 may analyze stored routing information 62 and PIM state information 64 to generate forwarding information 76 installed in forwarding engine 58.

Forwarding engine 58 may provide data plane functionality for router 50. Although not shown in FIG. 3, forwarding engine 58 may comprise a central processing unit (CPU), memory and one or more programmable packet-forwarding application-specific integrated circuits (ASICs). Forwarding information 76 may associate network destinations with specific next hops and corresponding ports of IFCs 60.

In accordance with one or more techniques of this disclosure, when router 50 operates as a LHR, routing engine 56 may be configured to generate an SDJ message to request source information from the RP or controller router. In some examples, routing engine 56 may use PIM 68 to request source information for one or more multicast groups in which router 50 is interested. For example, routing engine 56 may be configured to transmit an SDJ message to an RP or controller router to obtain source information for one or more multicast groups in which router 50 is interested. Upon receipt of the requested source information, routing engine 56 may update PIM state information 64 to include the learned addresses of sources actively providing traffic for the given multicast groups. In this way, routing engine 56 may use PIM 68 to build source trees directly to the active sources for the multicast groups.

In further accordance with one or more techniques of this disclosure, when router 50 operates as an RP router, routing engine 56 may be configured to receive and process an SDJ message transmitted by an LHR. For example, routing engine 56 may use PIM 68 to respond to the SDJ message from the LHR. Upon receipt of the SDJ message, routing engine 56 may look into register database 74 to determine which sources are actively providing traffic for the multicast groups. Routing engine 56 may update register database 74 based on different messages received from the LHR and received from a first hop router (FHR) connected to one or more sources. Router 50 may be configured to provide source information for specific multicast groups to the LHR as a result of processing the SDJ message.

The architecture of router 50 illustrated in FIG. 3 is shown for exemplary purposes only and is not be limited to this architecture. In other examples, router 50 may be configured in a variety of ways. In one example, some of the functionally of control unit 54 may be distributed within IFCs 60. Control unit 54 may be implemented solely in software, or hardware, or may be implemented as a combination of software, hardware, firmware, or any combinations thereof. For example, control unit 54 may include one or more processors configured to execute software instructions. In that case, the various software modules of control unit 54 may comprise executable instructions stored on a computer-readable medium, such as computer memory or hard disk.

Figure 4:
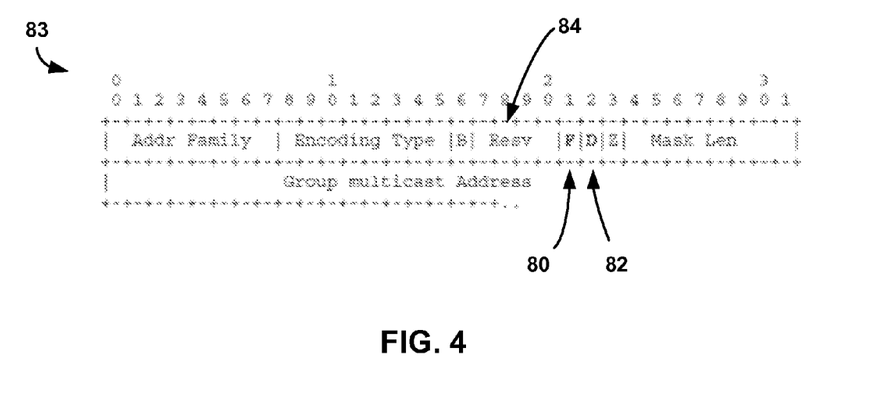
FIG. 4 is a conceptual diagram illustrating one example of an SDJ message format.

FIG. 4 is a conceptual diagram illustrating one example of an SDJ message format having two SD flags (e.g., F flag 80 and D flag 82). The term D flag may also be referred to as discovery flag and the term F flag may also be referred to as full dump flag. In the example shown, the two SD flags are each a single bit in length. However, in other examples, one or more SD flags may be one or more bits in length. Referring to the example of FIG. 4, the two SD flags are two reserved bits within a reserved bit space 84 of an encoded-group address message format 83, each being used for a particular purpose as described herein throughout this disclosure. As shown, by virtue of the encoded-group address message format 83 including the SD bits, the encoded-group address message format may also be referred to as an SDJ message format. Accordingly, as used herein, an SDJ message may refer to an encoded-group address message including one or more SD bits in examples where one or more reserved bits of the encoded-group address message are used to provide one or more techniques described herein. The encoded-group address message may be part of or otherwise constitute a join message. In other examples, as used herein, one or more SD bits may themselves be considered the SDJ message. For example, the SDJ message may be considered the D flag and/or F flag in the encoded-group address message.

In some examples, the D flag may be a reserve bit used for a particular purpose and the F flag may be a reserve bit used for a particular purpose. For example, the value of the D flag may represent an LHR's interest for source discovery. In such an example, the value of the D flag may represent an LHR's interest in obtaining or otherwise requesting an SD message from an RP router. Upon receipt of an SDJ message with the D flag having a first value, an RP router may be configured to not generate an SD message described herein. However, upon receipt of an SDJ message with the D flag having a second value different from the first value, an RP router may be configured to generate an SD message for transmission to the LHR that generated and sent the SDJ message.

In some examples, the F flag may represent an LHR's interest in receiving or otherwise requesting a full dump of active sources. In such an example, the value of the F flag may represent an LHR's interest in receiving a full dump. For example, the value of the F flag may represent an LHR's interest in receiving or otherwise requesting a full list of active sources identifiable by the RP router processing the SDJ message. Upon receipt of an SDJ message with the F flag having a first value, an RP router may be configured to not generate an SD message that identifies all active sources. However, upon receipt of an SDJ message with the F flag having a second value different from the first value, an RP router may be configured to generate an SD message that identifies all active sources (e.g., all active sources identifiable by the RP router) for transmission to the LHR that generated and sent the SDJ message.

Figure 5:
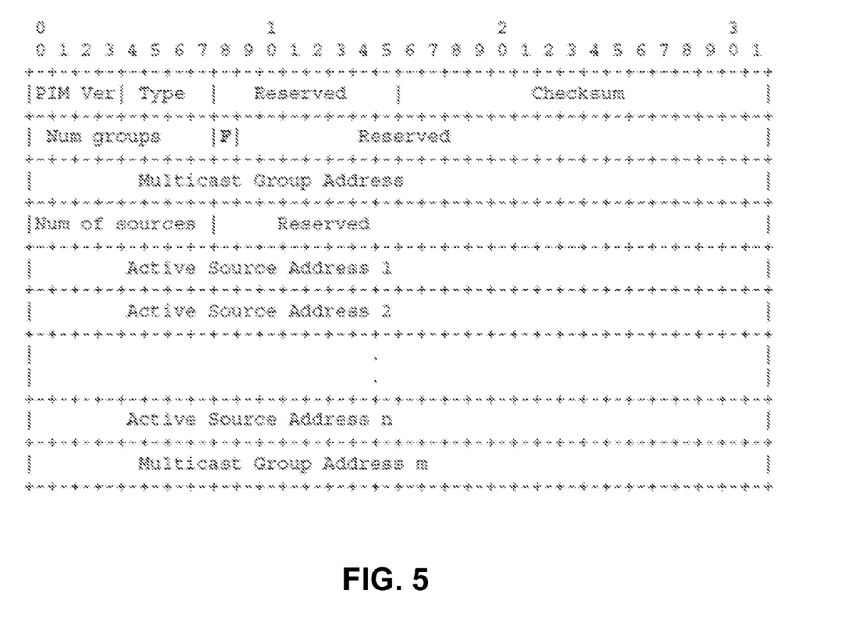
FIG. 5 is a conceptual diagram illustrating one example of an SD message format.

FIG. 5 is a conceptual diagram illustrating one example of an SD message format. An SD message formatted according to the example shown may include information regarding the number of groups, the number of sources, and the identity of one or more active sources (e.g., one or more active sources addresses).

The illustrated format may identify a multicast group in which the LHR has interested receivers, and may identify active source information for that multicast group. The packet format of the SD message illustrated in FIG. 5 is merely one example format. In other examples, different packet formats may be used for an SD message used to transmit source information for multicast groups in which a LHR is interested. As illustrated, the SD message may provide individual addresses for each active source associated with the multicast group in which the LHR has interested receivers (e.g., Active Source Address 1, Active Source Address 2 . . . Active Source Address N where N is the Nth Active Source Address). Also shown in FIG. 5 is an example of an SD message that includes bit space for an F flag as described herein. For example, the F flag in the SD message may indicate that the SD message includes a full dump of active sources. In some examples, the F flag in the SD message may be used by intermediate routers between an RP router and an LHR so that the intermediate routers know where to route the SD message. For example, the intermediate routers may route an SD message with a set F flag to the interfaces from which an SDJ message was previously received with the F flag set.

In the example shown, the F flag is to the right of the number of groups field.

In some examples, the SD message may identify one or more active sources for each multicast group in which the LHR expressed interested in the SDJ message. The SD message depicted is one example of an SD message that may be generated and sent to an LHR in response to receiving and processing an SDJ message received from the LHR. For example, while the message format shown in FIG. 5 only shows identification of one group, other examples of SD message formats may include more than one group and allow for identification of one or more active sources for each group. As another example, the format of an SD message may include an LHR address field for identifying the LHR to which the RP is sending the SD message. The SD message may provide individual addresses for each source that is actively providing traffic for each multicast group in which the LHR expressed interested.

Figure 6:
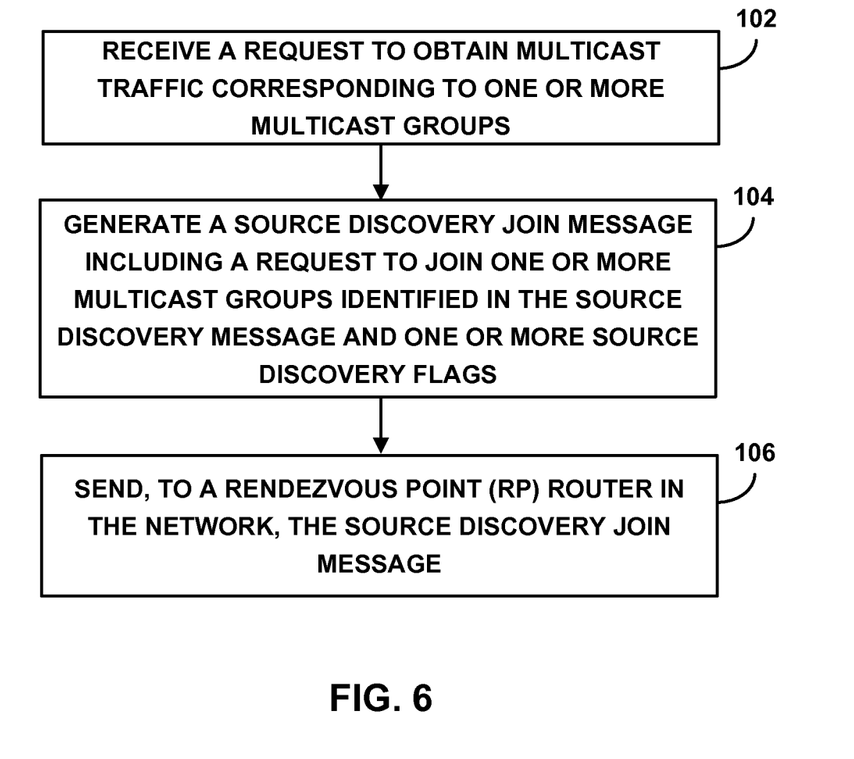
FIG. 6 is a flowchart illustrating an example operation of a LHR performing source discovery in accordance with one or more techniques of this disclosure.

FIG. 6 is a flowchart illustrating an example operation of an LHR (e.g., LHR 13 or LHR 13A) performing source discovery in accordance with one or more techniques of this disclosure. The example operation of FIG. 6 may be described with respect to LHR 13 or LHR 13A. The example operation of FIG. 6 may also be described with respect to router 50 when operating as an LHR.

An LHR may be configured to receive a request to obtain multicast traffic corresponding to one or more multicast groups (102). The LHR may be configured to generate a source discovery join message including a request to join one or more multicast groups identified in the source discovery message and one or more source discovery flags (104). In some examples, the one or more source discovery flags may each comprise one or more bits. In some examples, at least one of the one or more source discovery flags may indicate that the last hop router is interested in obtaining source information relating to at least one of the one or more multicast groups. In some examples, the message format to which the source discovery join message conforms may include a PIM Join message format. The LHR may be configured to send, to a rendezvous point (RP) router in the network, the source discovery join message (106).

In some examples, the one or more bits corresponding to each of the one or more source discovery flags are one or more reserve bits in the message format to which the source discovery join message conforms. At least one of the one or more source discovery flags may indicate that the last hop router is interested in obtaining a full dump of source information relating to at least one of the one or more multicast groups.

In some examples, the LHR may be configured to receive a source discovery message including source information indicating at least one source that is actively providing traffic for the at least one of the one or more multicast groups identified in the source discovery join message. The source discovery message may include one or more source discovery flags. The LHR may be configured to initiate establishment of at least one source tree toward the at least one source for the at least one of the one or more multicast group. The LHR may be configured to receive, upon establishment of the at least one source tree, the multicast traffic for the least one of the one or more multicast groups over the at least one source tree. In some examples, at least one of the one or more source discovery flags included in the source discovery message is the same as at least one of the one or more source discovery flags included in the source discovery join message.

Figure 7:
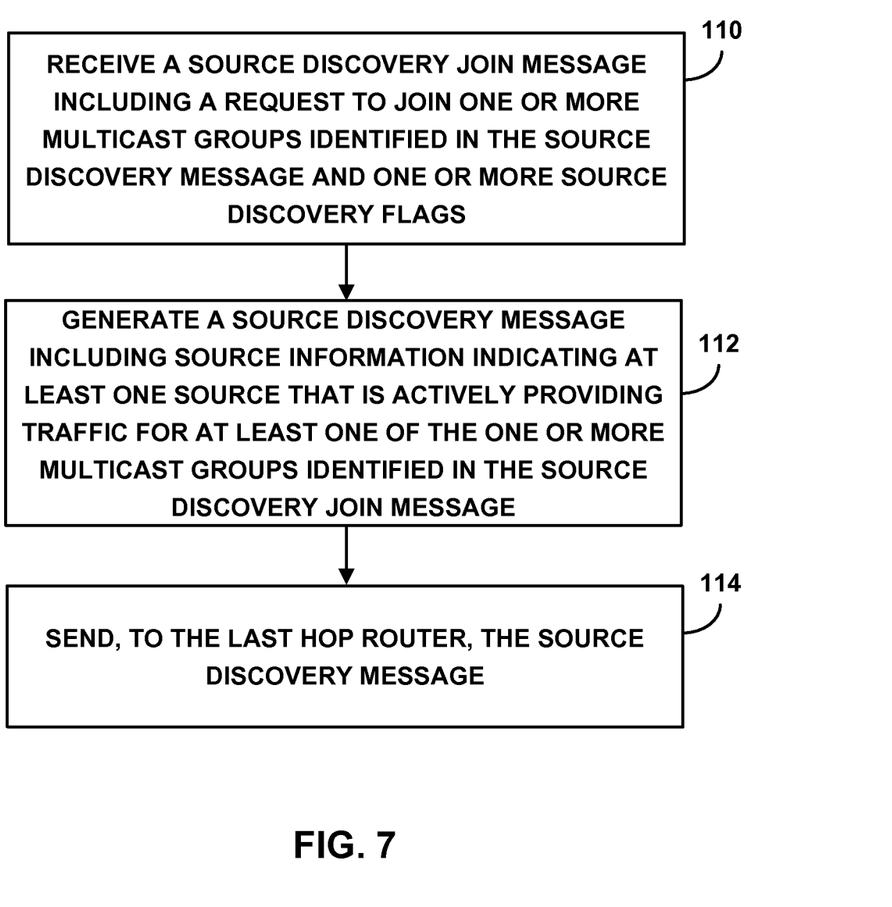
FIG. 7 is a flowchart illustrating an example operation of a RP router during source discovery by a LHR in accordance with one or more techniques of this disclosure.

FIG. 7 is a flowchart illustrating an example operation of an RP router during source discovery by an LHR in accordance with one or more techniques of this disclosure. The example operation of FIG. 7 may be described with respect to RP router 22. The example operation of FIG. 7 may be described with respect to router 50 when operating as an RP.

An RP router may be configured to receive a source discovery join message including a request to join one or more multicast groups identified in the source discovery message and one or more source discovery flags (110). In some examples, the one or more source discovery flags may each comprise one or more bits. In some examples, at least one of the one or more source discovery flags may indicate that a last hop router is interested in obtaining source information relating to at least one of the one or more multicast groups. In some examples, the message format to which the source discovery join message conforms may include a PIM Join message format. The RP router may be configured to generate a source discovery message including source information indicating at least one source that is actively providing traffic for at least one of the one or more multicast groups identified in the source discovery join message (112). In some examples, the source discovery message may include one or more source discovery flags. The RP router may be configured to send, to the last hop router, the source discovery message (114).

In some examples, the one or more bits corresponding to each of the one or more source discovery flags in the source discovery join message are one or more reserve bits in the message format to which the source discovery join message conforms. In some examples, at least one of the one or more source discovery flags in the source discovery join message may indicate that the last hop router is interested in obtaining a full dump of source information relating to at least one of the one or more multicast groups. At least one of the one or more source discovery flags included in the source discovery message may be the same as at least one of the one or more source discovery flags included in the source discovery join message.

In accordance with this disclosure, the term "or" may be interpreted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure. As another example, any network device described herein may be configured to perform any function described herein. For example, an LHR may be configured to perform any LHR functionality described herein, and an RP router may be configured to perform any RP functionality described herein.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples of the invention have been described. These and other examples are within the scope of the following claims.

What is claimed is:

1. A method comprising:
   receiving, by a last hop router in a network, a request to obtain multicast traffic corresponding to one or more multicast groups;
   generating, by the last hop router, a source discovery join message including a request to join one or more multicast groups identified in the source discovery message and an additional flag, wherein the additional flag comprises one or more bits, wherein the additional flag indicates that the last hop router is interested in obtaining source information relating to at least one of the one or more multicast groups, and wherein the message format to which the source discovery join message conforms includes a PIM Join message format; and
   sending, by the last hop router to a rendezvous point (RP) router in the network, the source discovery join message.

2. The method of claim 1, wherein the one or more bits corresponding to the additional flag are one or more reserve bits in the message format to which the source discovery join message conforms.

3. The method of claim 1, wherein the additional flag is a first additional flag, and wherein generating the source discovery join message includes generating the source discovery join message to include a second additional flag indicating that the last hop router is interested in obtaining a full dump of source information relating to at least one of the one or more multicast groups.

4. The method of claim 1, further comprising:
   receiving, by the last hop router, a source discovery message including source information indicating at least one source that is actively providing traffic for the at least one of the one or more multicast groups identified in the source discovery join message, wherein the source discovery message includes one or more source discovery flags;
   initiating, by the last hop router, establishment of at least one source tree toward the at least one source for the at least one of the one or more multicast groups; and
   receiving, by the last hop router upon establishment of the at least one source tree, the multicast traffic for the least one of the one or more multicast groups over the at least one source tree.

5. The method of claim 4, wherein at least one of the one or more source discovery flags included in the source discovery message is the same as the additional flag included in the source discovery join message.

6. The method of claim 1, further comprising:
   receiving, by the RP router, the source discovery join message;
   generating, by the RP router, a source discovery message including source information indicating at least one source that is actively providing traffic for the at least one of the one or more multicast groups identified in the source discovery join message;
   sending, by the RP router to the last hop router, the source discovery message;
   initiating, by the last hop router based on the source discovery message, establishment of at least one source tree toward the at least one source for the at least one of the one or more multicast groups; and
   receiving, by the last hop router upon establishment of the at least one source tree, the multicast traffic for the least one of the one or more multicast groups over the at least one source tree.

7. A network device operating as a last hop router (LHR) in a network, the LHR comprising:
   a memory; and
   one or more processing units configured to:
      receive a request to obtain multicast traffic corresponding to one or more multicast groups;
      store the request in the memory;
      generate a source discovery join message including a request to join one or more multicast groups identified in the source discovery message and an additional flag, wherein the additional flag comprises one or more bits, wherein the additional flag indicates that the last hop router is interested in obtaining source information relating to at least one of the one or more multicast groups, and wherein the message format to which the source discovery join message conforms includes a PIM Join message format; and
      send, to a rendezvous point (RP) router in the network, the source discovery join message.

8. The network device of claim 7, wherein the one or more bits corresponding to the additional flag are one or more reserve bits in the message format to which the source discovery join message conforms.

9. The network device of claim 7, wherein the additional flag is a first additional flag, and wherein the one or more processing units are configured to generate the source discovery join message to include a second additional flag indicating that the last hop router is interested in obtaining a full dump of source information relating to at least one of the one or more multicast groups.

10. The network device of claim 7, wherein the one or more processing units are further configured to:
    receive a source discovery message including source information indicating at least one source that is actively providing traffic for the at least one of the one or more multicast groups identified in the source discovery join message, wherein the source discovery message includes one or more source discovery flags;
    initiate establishment of at least one source tree toward the at least one source for the at least one of the one or more multicast groups; and
    receive, upon establishment of the at least one source tree, the multicast traffic for the least one of the one or more multicast groups over the at least one source tree.

11. The network device of claim 10, wherein at least one of the one or more source discovery flags included in the source discovery message is the same as the additional flag included in the source discovery join message.

12. A method comprising:
    receiving, by a rendezvous point (RP) router in a network, a source discovery join message including a request to join one or more multicast groups identified in the source discovery message and an additional flag, wherein the additional flag comprises one or more bits, wherein the additional flag indicates that a last hop router is interested in obtaining source information relating to at least one of the one or more multicast groups, and wherein the message format to which the source discovery join message conforms includes a PIM Join message format;
    generating, by the RP router, a source discovery message including source information indicating at least one source that is actively providing traffic for at least one of the one or more multicast groups identified in the source discovery join message, wherein the source discovery message includes one or more source discovery flags; and sending, by the RP router to the last hop router, the source discovery message.

13. The method of claim 12, wherein the one or more bits corresponding to the additional flag in the source discovery join message are one or more reserve bits in the message format to which the source discovery join message conforms.

14. The method of claim 12, wherein the additional flag is a first additional flag, and wherein the source discovery join message includes a second additional flag indicating that the last hop router is interested in obtaining a full dump of source information relating to at least one of the one or more multicast groups.

15. The method of claim 12, wherein at least one of the one or more source discovery flags included in the source discovery message is the same as the additional flag included in the source discovery join message.

16. The method of claim 12, further comprising:
receiving, by the last hop router, the source discovery message;
initiating, by the last hop router, establishment of at least one source tree toward the at least one source for the at least one of the one or more multicast groups; and
receiving, by the last hop router upon establishment of the at least one source tree, the multicast traffic for the least one of the one or more multicast groups over the at least one source tree.

17. A network device operating as a rendezvous point (RP) router in a network, the RP router comprising:
a memory; and one or more processing units configured to:
receive a source discovery join message including a request to join one or more multicast groups identified in the source discovery message and an additional flag, wherein the additional flag comprises one or more bits, wherein the additional flag indicates that a last hop router is interested in obtaining source information relating to at least one of the one or more multicast groups, and wherein the message format to which the source discovery join message conforms includes a PIM Join message format;
store the source discovery join message in the memory;
generate a source discovery message including source information indicating at least one source that is actively providing traffic for at least one of the one or more multicast groups identified in the source discovery join message, wherein the source discovery message includes one or more source discovery flags; and
send, to the last hop router, the source discovery message.

18. The network device of claim 17, wherein the one or more bits corresponding to the additional flag in the source discovery join message are one or more reserve bits in the message format to which the source discovery join message conforms.

19. The network device of claim 17, wherein the additional flag is a first additional flag, and wherein the source discovery join message includes a second additional flag indicating that the last hop router is interested in obtaining a full dump of source information relating to at least one of the one or more multicast groups.

20. The network device of claim 17, wherein at least one of the one or more source discovery flags included in the source discovery message is the same as the additional flag included in the source discovery join message.

* * * * *